A. L. GALUSHA.
GAS SCRUBBER.
APPLICATION FILED DEC. 24, 1907.

902,958.

Patented Nov. 3, 1908.

2 SHEETS—SHEET 1.

WITNESSES
E. Nottingham
G. F. Downing

INVENTOR
A. L. Galusha
By H. A. Seymour
Attorney

A. L. GALUSHA.
GAS SCRUBBER.
APPLICATION FILED DEC. 24, 1907.
902,958.
Patented Nov. 3, 1908.
2 SHEETS—SHEET 2.
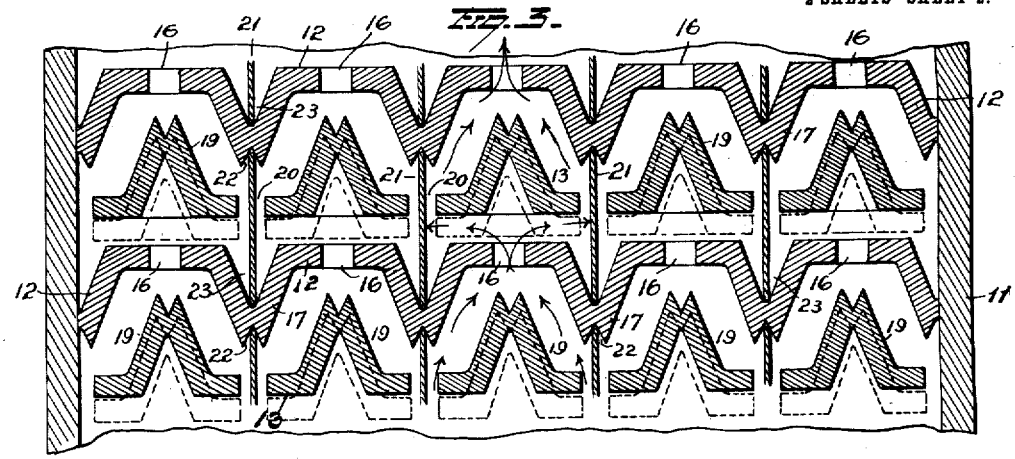
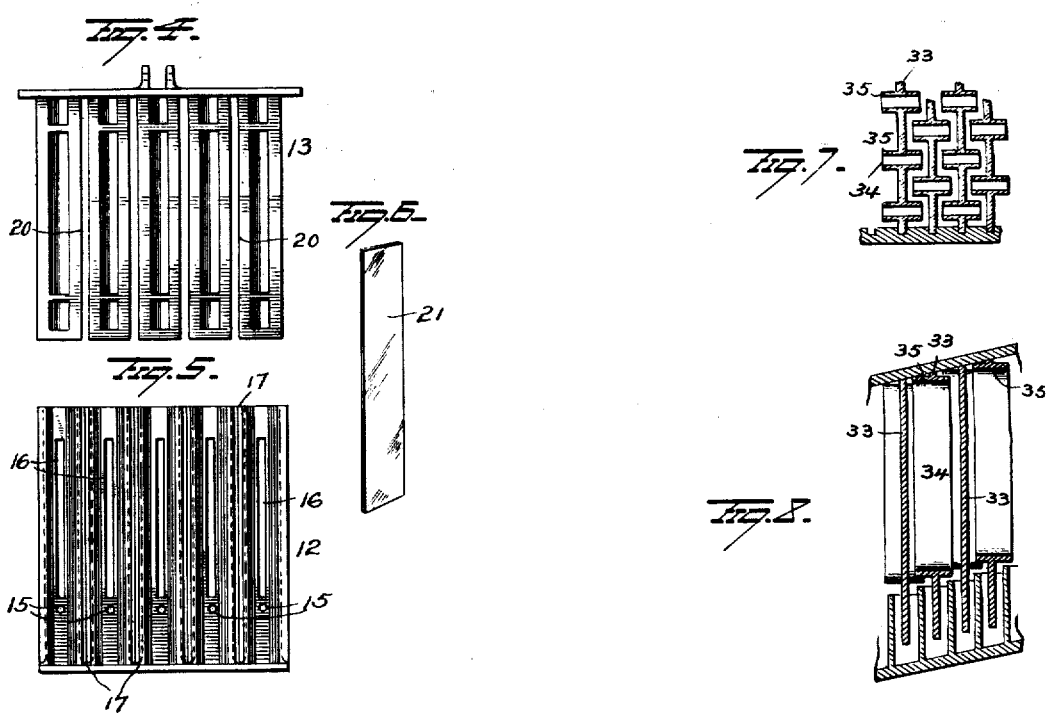
WITNESSES
E. L. Nottingham
G. F. Downing
INVENTOR
A. L. Galusha
By H. A. Seymour
Attorney

UNITED STATES PATENT OFFICE.

ALBERT L. GALUSHA, OF DORCHESTER, MASSACHUSETTS.

GAS-SCRUBBER.

No. 902,958. Specification of Letters Patent. Patented Nov. 3, 1908.

Application filed December 24, 1907. Serial No. 407,952.

*To all whom it may concern:*

Be it known that I, ALBERT L. GALUSHA, of Dorchester, in the county of Suffolk and State of Massachusetts, have invented certain new and useful Improvements in Gas-Scrubbers; and I do hereby declare the following to be a full, clear, and exact description of the invention, such as will enable others skilled in the art to which it appertains to make and use the same.

My invention relates to improvements in gas apparatus, and more particularly to washing and scrubbing means,—one object of the invention being to construct a scrubber in such manner that a maximum number of contacting surfaces for gas ladened with moisture and extraneous matter, will be afforded, and so that a maximum number of sharp angles will be had,—at the same time confining the parts to a comparatively small space and reducing the number of baffle plates employed to a minimum.

A further object is to so construct a gas scrubber that the gas passages will be automatically increased or diminished in size so that, regardless of the gas passing, its velocity will be maintained sufficiently high to throw off, against the surfaces, water, tar and impurities which the gas may contain.

With these objects in view the invention consists in certain novel features in construction and combinations of parts as hereinafter set forth and pointed out in the claims.

Figure 1:
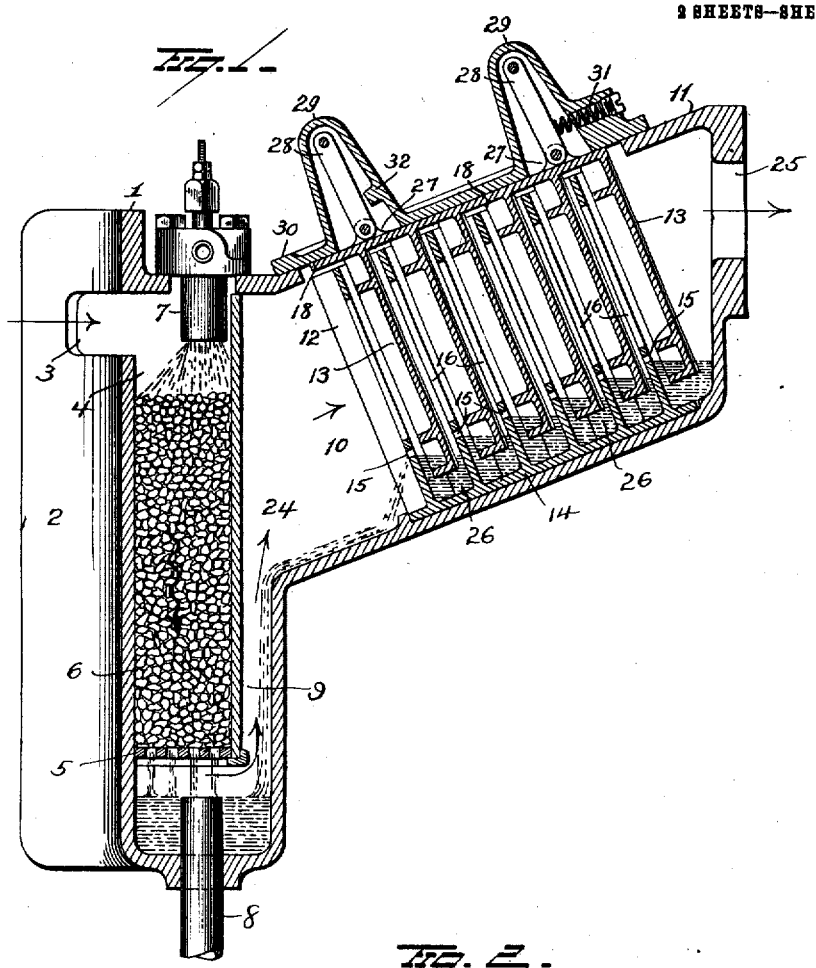
Figure 2:
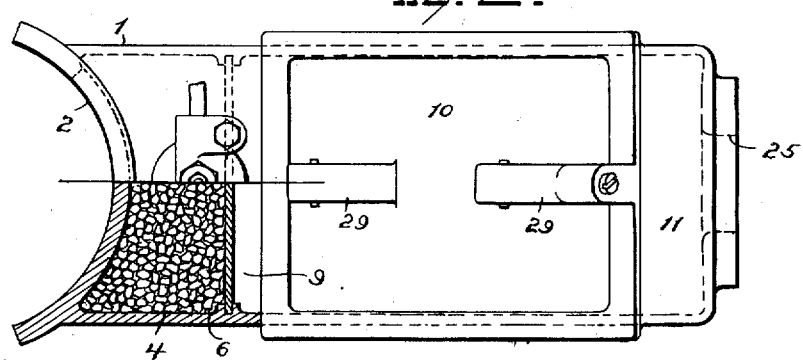

In the accompanying drawings, Figure 1 is a longitudinal sectional view of an apparatus embodying my improvements. Fig. 2 is a plan view partly in section. Fig. 3 is a horizontal sectional view of a portion of the scrubber. Figs. 4 and 5 are views of the baffle plates. Fig. 6 is a face view of one of the thin baffle plates, and Figs. 7 and 8 are views illustrating a modification.

1 represents a vertical shell, preferably made with a curved wall 2 to accommodate the cylindrical wall of a vaporizer (not shown) or other cylindrical part of a gas apparatus from which gas enters said shell through an inlet opening 3 near the upper end thereof. The shell 1 contains a chamber 4 which terminates at its lower end above the bottom of said shell and is provided with a grating 5 to support within said chamber a body of insoluble material 6, such, for instance, as gravel. A water jet 7 discharges into the upper end of the chamber 4 and the water and gas in their circuitous passage through the mass 6 become intimately commingled. The water, as such, containing some of the impurities of the gas, will settle in the bottom of this shell and then flow off through a pipe 8, the upper end of which projects a short distance above the bottom of said shell.

The gas, laden with moisture and containing extraneous elements, will pass from the lower end of the chamber 4 upwardly through a duct 9 and enter the scrubber 10. This scrubber comprises a casing 11 disposed in an inclined position, as clearly shown in Fig. 1. Within the casing 11 two series of baffle plates 12—13 are located. The baffle plates 12 are made integral with and project upwardly from a plate 14 which rests upon the inclined bottom of the casing 11 so that said baffle plates themselves will be disposed in inclined positions. Each baffle plate 12 is provided above the lower end thereof with a series of perforations 15 for the passage of water (charged with impurities) which will become deposited in the bottom of the chamber 11, as will be hereinafter more fully explained. Each baffle plate 12 is also provided with a series of elongated slots or openings 16 and between these slots or openings with ribs or projections 17 which serve to extend the surface area of the plate and also afford a number of sharp angles which the moisture laden gas must turn and thus cause the same to be thrown against the adjacent surfaces, upon which the moisture and the impurities contained therein will become deposited.

The baffle plates 13 alternate with the baffle plates 12 and are made integral with a supporting plate 18 from which they depend. Each baffle plate 13 is provided with a series of angular ribs or projections 19 similar in form and having the same functions as the ribs or projections 17 of the baffle plates 12. Between the ribs or projections 19, the baffle plate 13 is provided with a series of slots or passages 20. A series of thin, transversely-disposed plates 21 pass through the slots 20. One edge of each of these plates is disposed in a V-shaped notch 22 in a rib 17 of baffle plate 12 and the other edge of each plate 21 rests at the apex of the V-shaped wall 23 formed by a rib or projection on another baffle plate 12.

Gas entering the scrubber at 24 will pass through the slots or openings 16 of the first baffle plate 12 and will impinge against the V-shaped walls formed by the inner faces of the ribs or projections 19 on the adjacent baffle plate 13. Some of the moisture and foreign matter will become deposited upon these walls of the plate 13 and, running down said walls, will become deposited in the bottom of the casing 11. The gas still containing more or less moisture, will flow between the plates 12 and 13 and in its passage through the openings 20 in plate 13, more moisture and impurities will become deposited upon the thin transverse plates 21 and find their way to the bottom of the casing 11 in the same manner as before explained. After passing through the openings 20 the moisture laden gas (now relieved of a portion of the extraneous elements which it contained) will impinge against additional surfaces afforded by projections of plate 13 and of the next plate 12 and also by the walls of said plates and more moisture with the impurities which it carries will become deposited on these surfaces and, running down the same will become deposited in the bottom of casing 11. The gas will thus pass successively through and between the series of baffle plates and the dry gas freed from the undesirable extraneous elements, will leave the scrubber at 25. As the water and impurities accumulate in the bottom of the casing, the same will overflow through the perforations 15, thus passing successively from the chambers 26 formed by the lower portions of the plates 12 and finally from the last of these chambers 26 along the bottom inclined wall of the casing 11 and through the passage 9 into the bottom of the shell 1 and be discharged through the waste pipe 8.

The gas in passing between the baffle plates 12—13 must have sufficient velocity at all times so as to throw the extraneous elements removed at the plates 21 near enough to the surface thereof to permit capillary attraction to draw them from the gas and keep them in contact with the surfaces afforded by the baffle plates. This of course means certain differences in gas pressure between the baffle plates 12 and 13. With variable volume of gas passing and the constant velocity desired, the area of the gas passages must vary. To accomplish this the baffle plates 13 are so mounted that they can move relatively to the baffle plates 12. For this purpose the supporting plate 18 of the baffle plates 13 is provided with lugs 27 for the attachment of the lower ends of links 28,—the upper ends of said links being pivotally supported in hollow enlargements 29 on a plate 30, which latter constitutes the upper inclined wall of the inclined casing 11. The baffle plates 13 are thus suspended from the pivoted links 28 and the normal positions of the baffle plates 13 is maintained under normal conditions, by means of a spring 31 which bears against one of the links 28. A stop 32 may be formed in one of the other enlargements 29 to engage the link therein and limit the movement of the baffle plates 13 in the direction of the flow of gas through the scrubber. With this construction, gravity and the manually adjustable pressure of the spring 31 will tend to keep the baffle plates 12 and 13 together. The difference in gas pressure at 24 and at 25 will tend to move said plates apart and when gas is flowing, balances the opposed pressure which is constant. Consequently the difference in gas pressure is constant and this constant difference in gas pressure gives constant velocity of gas, which is desired.

In the construction of baffle plates shown in Figs. 7 and 8, each plate 33 is made with a series of gas passages 34, the parallel walls of each of which are formed partially by means of parallel flanges 35 which project laterally from both faces of each plate and the flanges on one plate are so disposed relatively to the flanges and gas passages of the adjacent plate that they will alternate therewith. Thus the moisture laden gas passing through the gas passages of one plate will impinge against the body of the adjacent plate and will be caused to make several sharp turns before passing through the gas passages of such adjacent plate. The gas will therefore turn more than 180° between each two deflection pieces or plates and in fact in both constructions and arrangements of baffle plates which I have herein described, a maximum number of sharp angles will be afforded as well as a maximum number and extent of contacting surfaces.

It will be observed that the construction and arrangement of parts herein shown and described affords a gas scrubber of great compactness, made up of simple duplicate parts, any of which can be easily inspected, cleaned, removed or replaced without disturbing the others. It will also be observed that the scrubbing and drying of wet gas are accomplished simultaneously in the same apparatus and by use of the same devices. No water (as such) is put into the scrubber and the gas is kept apart from water and its movements through the scrubber. Furthermore by means of my improvements the area of the gas passages will be automatically varied by the action of the gas itself when the volume of gas changes, thus keeping the velocity of gas through passages in the scrubber approximately constant or variable only within certain limits regardless of changes in volume of gas passing.

Having fully described my invention what I claim as new and desire to secure by Letters-Patent, is—

1. In a gas scrubber, the combination with a casing, of two series of baffle plates therein, the plates of one series alternating with the plates of the other, each plate provided with gas passages, and plates connecting two baffle plates of one series and passing through gas passages in a baffle plate in the other series.

2. In a gas scrubber, the combination with a casing, of a plurality of baffle plates therein, each provided with ribs or projections and with gas passages alternating with said ribs or projections, and transverse plates connecting the ribs or projections of two of said baffle plates and passing through gas passages in the intermediate baffle plate.

3. In a gas scrubber, the combination with a casing, of three baffle plates therein, each provided with gas passages and hollow projections alternating with said gas passages, the hollow projections of the intermediate baffle plates alining with gas passages in the adjacent baffle plates and the hollow projections of the last mentioned plates being approximately in line with the gas passages of the intermediate baffle plate, and plates extending through the gas passages of the intermediate baffle plate and engaging the hollow projections of the baffle plates at respective sides of said intermediate baffle plates.

4. In a gas scrubber, the combination with a plurality of baffle plates provided with gas passages, of means for automatically varying the area between the baffle plates.

5. In a gas scrubber, the combination with a casing, of two series of baffle plates having gas passages in them, said baffle plates disposed to form gas passages between them, and means operating automatically to vary the area between plates of respective sets.

6. In a gas scrubber, the combination with a casing and baffle plates, of means operating automatically to keep the velocity of gas through said baffle plates approximately constant.

7. In a gas scrubber, the combination with a casing, of a series of stationary baffle plates therein having gas passages, and a series of movable baffle plates alternating with the stationary baffle plates, said movable baffle plates having gas passages out of line with the gas passages of the stationary baffle plates.

8. In a gas scrubber, the combination with a casing, of a stationary baffle plate located therein and provided with gas passages, a movable baffle plate in advance of the stationary baffle plate and having gas passages out of alinement with the gas passages of the stationary baffle plate.

9. In a gas scrubber, the combination with a casing, of a series of stationary baffle plates, each having gas passages, a series of movable baffle plates alternating with the stationary baffle plates and having gas passages out of alinement with the gas passages of the stationary baffle plates, and means operating automatically to cause the movable plates to move simultaneously and vary the gas passages formed between the stationary baffle plates and the movable baffle plates in advance of them.

10. In a gas scrubber, the combination with a casing, of a series of plates fixed at their lower ends in said casing and provided with elongated gas passages terminating above their lower ends and a similar series of plates alternating with the first mentioned plates and terminating at their lower ends above the bottom of the casing and below the gas passages of said first mentioned plates, the lower ends of one series of baffle plates forming drainage chambers in which the lower ends of the other baffle plates are located.

11. In a gas scrubber, the combination with a casing and a series of stationary baffle plates therein, of a series of movable baffle plates alternating with the stationary baffle plates and unrestricted means tending to cause the movable baffle plates to normally move toward the stationary baffle plates.

12. In a gas scrubber, the combination with a casing and a series of stationary baffle plates therein, of a series of movable baffle plates in advance respectively of the stationary baffle plates, and means normally tending to press the movable baffle plates rearwardly toward the stationary baffle plates.

13. In a gas scrubber, the combination with an inclined casing and inclined stationary baffle plates therein, of a series of movable baffle plates suspended in said casing in advance respectively of the stationary baffle plates and normally tending to swing toward the stationary baffle plates.

14. In a gas scrubber, the combination with a casing and a series of inclined, stationary baffle plates therein, of a series of movable baffle plates disposed respectively in advance of the respective stationary baffle plates, and means for suspending said movable baffle plates and permitting them to normally swing toward the stationary baffle plates.

15. In a gas scrubber, the combination with a casing and a series of stationary baffle plates therein, of a series of movable baffle plates, a plate connecting the movable baffle plates, pivoted links pivotally attached to said plate, and a spring engaging one of said links and tending to press the movable baffle plates rearwardly toward the stationary baffle plates.

16. The combination with a shell provided with a chamber to contain insoluble material and having gas inlet near its upper end communicating with said chamber and a waste pipe communicating with the shell below the chamber therein, of a casing communicating with said shell, a plurality of baffle plates in said casing, and drainage chambers in the bottom of said casing, said drainage chambers communicating with each other and one of said drainage chambers discharging into the portion of the shell with which said casing communicates, and means for discharging water into the top of said shell.

17. The combination with a shell provided with a chamber to contain insoluble material, a water spraying means discharging upon said material, said casing having a gas inlet near its top and a water chamber in its bottom, and a drain pipe communicating with said water chamber, of an inclined casing communicating with said shell, a plurality of baffle plates within said casing and drainage chambers in the bottom of said casing, said drainage chambers communicating with each other and adapted to discharge through said casing to the water chamber in the bottom of said shell.

In testimony whereof, I have signed this specification in the presence of two subscribing witnesses.

ALBERT L. GALUSHA.

Witnesses:
JAMES H. DUFFY,
CHARLES S. DONAHUE.